June 6, 1967     F. J. JOHNS     3,324,322
DYNAMOELECTRIC MACHINE HAVING A CONCENTRIC COIL WINDING
Filed June 18, 1964     3 Sheets-Sheet 1

INVENTOR
Francis J. Johns
BY
ATTORNEY

June 6, 1967 F. J. JOHNS 3,324,322
DYNAMOELECTRIC MACHINE HAVING A CONCENTRIC COIL WINDING
Filed June 18, 1964 3 Sheets-Sheet 2
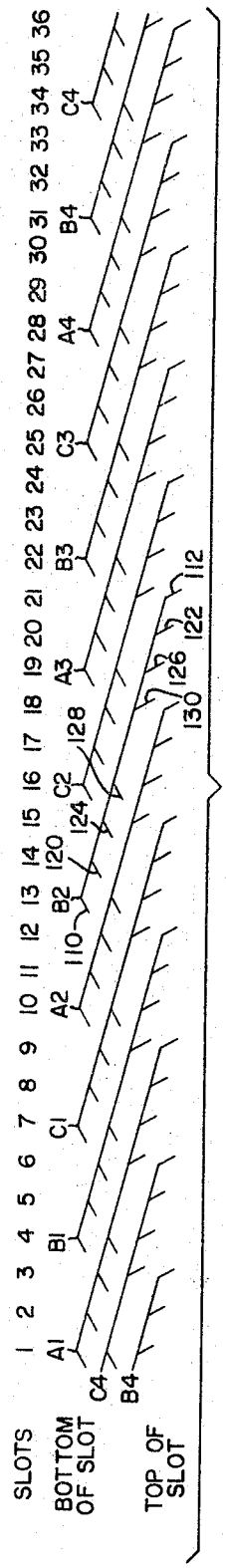
Fig. 5.
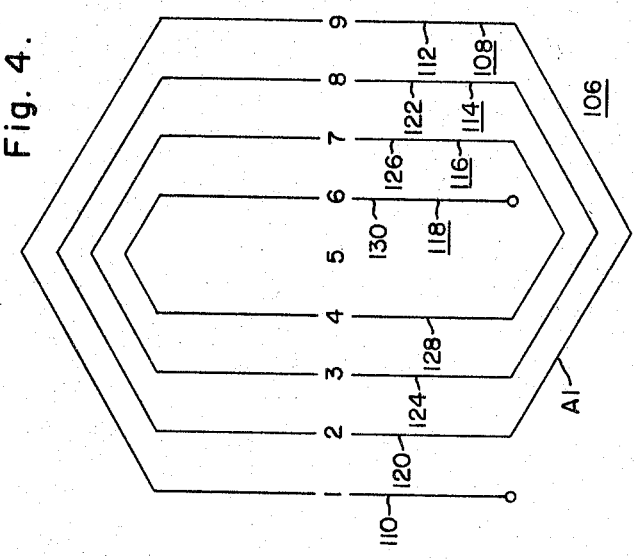
Fig. 6.
| NUMBER OF COIL SIDES | | | | | | | |
|---|---|---|---|---|---|---|---|
| POSITION IN SLOT | BOTTOM (IN MOST) | | MIDDLE | | TOP (OUT MOST) | | |
| COIL SIDES | 110 | 120 | 124 | 128 | 130 | 112 | 122 | 126 |
| PHASE A | 4 | 4 | 4 | 4 | 4 | 4 | 4 | 4 |
| PHASE B | 4 | 4 | 4 | 4 | 4 | 4 | 4 | 4 |
| PHASE C | 4 | 4 | 4 | 4 | 4 | 4 | 4 | 4 |
Fig. 4.

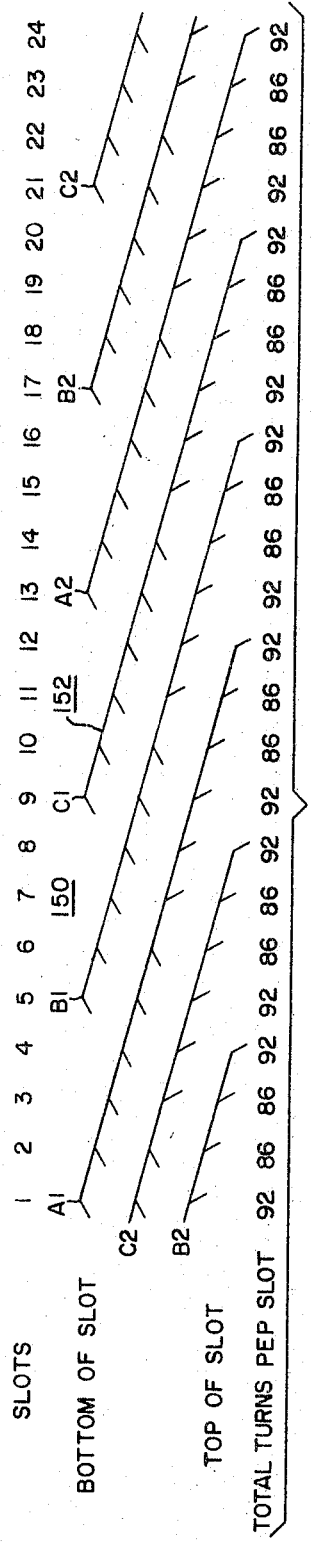
Fig. 8.
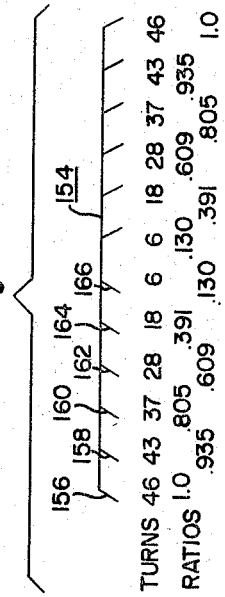
Fig. 7.
Fig. 9.
| POSITION IN SLOT | BOTTOM (IN MOST) | | | MIDDLE | | TOP (OUT MOST) | | |
|---|---|---|---|---|---|---|---|---|
| COIL SIDES | 156 | 158 | 160 | 162 | 164 | 166 | 162 | 160 | 158 | 156 |
| RATIO OF TURNS | 1.0 | .935 | .805 | .609 | .391 | .130 | .609 | .805 | .935 | 1.0 |
| PHASE A | 2 | 2 | 2 | 2 | 4 | 4 | 2 | 2 | 2 | 2 |
| PHASE B | 2 | 2 | 2 | 2 | 4 | 4 | 2 | 2 | 2 | 2 |
| PHASE C | 2 | 2 | 2 | 2 | 4 | 4 | 2 | 2 | 2 | 2 |
NUMBER OF COIL SIDES

United States Patent Office 3,324,322
Patented June 6, 1967

3,324,322
DYNAMOELECTRIC MACHINE HAVING A
CONCENTRIC COIL WINDING
Francis J. Johns, Buffalo, N.Y., assignor to Westinghouse
Electric Corporation, Pittsburgh, Pa., a corporation of
Pennsylvania
Filed June 18, 1964, Ser. No. 376,174
3 Claims. (Cl. 310—198)

The present invention relates to dynamoelectric machines and more particularly to dynamoelectric machines or induction motors having a concentric coil winding.

In the manufacture of dynamoelectric machines, such as polyphase induction motors, and particularly the commercially common three-phase induction motors, it is desirable that the winding on the primary core member or stator be so arranged as substantially to produce a spatial sinusoidal M.M.F. wave while simultaneously providing electrical balance in reactance and resistance among the phase circuits of the winding. Although these end results in most cases can satisfactorily be achieved through the use of a lap winding, with some sacrifice in motor performance, substantial manual labor and corresponding manufacturing expense are required for placement of a lap winding in a machine. On the other hand, a concentric coil winding can be formed substantially by machine rather than manual labor, but difficulties are ordinarily encountered in placing the coil sides of the concentric coil winding so as to achieve electrical balance among the phase circuits of the winding.

In accordance with the principles of the present invention, a dynamoelectric machine or three-phase induction motor having a suitable rotor and frame comprises a stator core mounted on the frame and having a concentric coil winding which is so arranged as substantially to provide electrical balance among the circuit phases while substantially providing for the generation of a spatial sinusoidal M.M.F. wave. Respective concentric coil winding units form the overall concentric coil winding and are preferably substantially identical for the purpose of manufacturing economy and facility.

It is therefore an object of the invention to provide a novel dynamoelectric machine or a polyphase induction motor in which the stator is provided with a concentric coil winding arranged to provide improved machine operating efficiency.

It is another object of the invention to provide a novel dynamoelectric machine or three-phase induction motor in which the stator is provided with a concentric coil winding which is efficiently arranged to produce substantially both a spatial sinusoidal M.M.F. wave and electrical balance among the phases.

A further object of the invention is to provide a novel dynamoelectric machine or three-phase induction motor in which the stator is provided with a concentric coil winding which is efficiently arranged to produce substantially both a spatial sinusoidal M.M.F. wave and electrical balance among the phases, and which further is so arranged that it comprises substantially identical concentric coil units for the purpose of achieving manufacturing facility and economy.

These and other objects of the invention will become more apparent on consideration of the following detailed description along with the attached drawings, in which:

FIGS. 2–4 show respective schematic views of a concentric coil unit employed in a concentric coil winding of the stator of FIG. 1;

FIG. 5 shows a schematic view of the manner in which the concentric coil units are disposed in the stator slots to form the concentric coil winding;

FIG. 6 is a table showing coil side locations in the stator slots;

FIG. 7 shows a schematic view of a concentric coil unit employed in a two-pole motor constructed in accordance with the principles of the invention;

FIG. 8 shows a schematic view of the manner in which a plurality of the concentric coil units of FIG. 7 are disposed in stator slots of the two-pole motor; and FIG. 9 is a table similar to the table shown in FIG. 6 and it shows the slot location and number of coil sides in the two pole motor schematically illustrated in FIG. 8.

Figure 1:
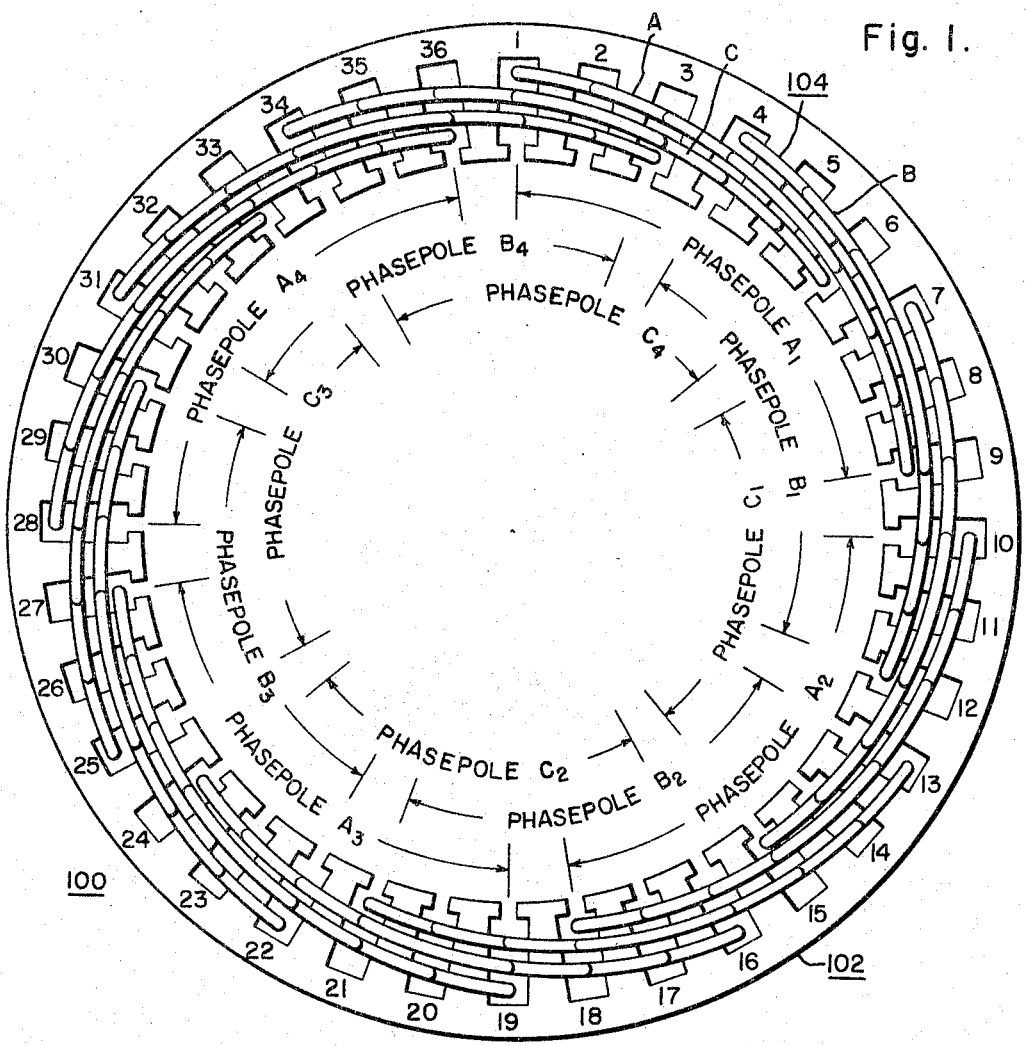
FIGURE 1 shows a stator with a schematically illustrated winding for a four-pole three-phase induction motor constructed in accordance with the principles of the invention.

More specifically, there is shown in FIG. 1 a stator 102 and stator winding 104 for a dynamoelectric machine 100 having a suitable rotor (not shown) and a suitable frame (not shown) on which the stator 102 and the rotor are mounted. In this instance, the machine 100 is in the form of a three-phase induction motor, but the machine 100 can be provided in other forms. For example, the stator 102 and the winding 104, with suitable engineering design, can be employed in a synchronous machine using a standard DC excited field or in a hysteresis rotor machine.

In the motor 100, the concentric coil winding 104 substantially produces a spatial sinusoidal M.M.F. wave in the rotor-stator air gap (not indicated) and simultaneously electrical phase balance is substantially achieved among phase circuits A, B and C (FIG. 1) of the concentric coil winding 104. For this purpose, a plurality of concentric coil units 106 (FIG. 4) are arranged in stator core slots 1–36 (FIG. 1) about the inner periphery of the stator 102, with respective concentric coil units A1–A4, B1–B4, and C1–C4 (FIG. 5) producing respective phase poles A1–A4, B1–B4 and C1–C4 as indicated. The coil units 106 may also be referred to as coil groups or pole groups, each consisting of a group of concentric coils connected together to form a magnetic pole when energized. Each combination of phase poles A1–B1–C1, A2–B2–C2, A3–B3–C3 or A4–B4–C4 corresponds to a magnetic pole in the rotating air gap flux and the motor 100 thus is characterized as a four-pole motor. A suitable three-phase energy source (not shown) is used to energize the concentric coil winding 104, and the concentric coil units A1–A4, B1–B4 or C1–C4 can respectively be connected in series or in parallel with each other and then connected to the three-phase energy source to provide the phase circuits A, B and C in the concentric coil winding 104.

All of the concentric coil units 106 are preferably identical, with each of the units 106 provided with an outer coil 108 (FIG. 4) which is sized to span nine stator slots in accordance with the usual formula $$\frac{S}{P}-1$$

where S equals the number of slots and P equals the number of motor poles. Thus, for the concentric coil units A1, respective coil sides 110 and 112 of the outer coil 108 are disposed in slots 1 and 9 of the stator 102. Concentrically within the outer coil 108 in each concentric coil unit 106, there are provided coils 114, 116 and 118. For the concentric coil unit A1, the coil 114 thus is provided with coil sides 120 and 122 respectively disposed in stator slots 2 and 8, the coil 116 is provided with coil sides 124 and 126 respectively disposed in stator core slots 3 and 7, and the coil 118 is provided with coil sides 128 and 130 respectively disposed in stator core slots 4 and 6.

Figure 2:
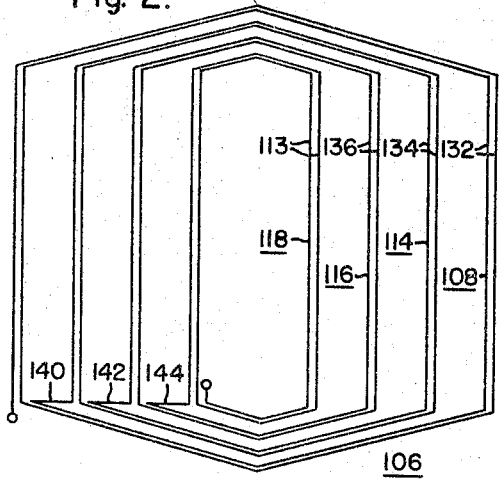

As shown in FIG. 2, each coil 108 or 114 or 116 or 118 in each concentric coil unit 106 preferably comprises a plurality of turns 132, 134, 136 or 138. These respective turns are wound in series to form the respective coils 108, 114, 116 and 118, and in the manufacturing process separate reels of suitably insulated copper wire can be used for forming the respective coils with the desired number of turns for each. End connections 140, 142 and 144 can then be made so as to establish a series circuit path for the entire concentric coil unit 106.

Figure 3:
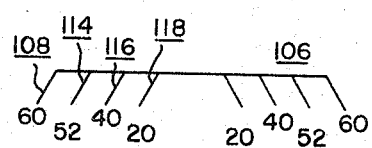

To provide for substantially sinusoidal distribution of the M.M.F. wave in the rotor-stator air gap space, the number of turns in the respective coils 108, 114, 116 and 118 is proportioned according to a full sinusoidal cycle of a sinusoidal waveform extending across the span of the outermost coil 108. Thus, in the example shown in FIGURE 3, the outer coil 108 is provided with 60 turns and the inner coils 114, 116 and 118, respectively are proivded with 52 turns, 40 turns and 20 turns. The appropriate sinusoidal ratio of 1 to 0.865 to 0.666 to 0.333 is thus provided for the four-coil concentric coil unit 106.

In order to install the concentric coil winding 104 in the motor stator 102 during the manufacturing process, the concentric coil units 106, preferably prewound by machine and preferably all identical, are placed in the stator slots 1–36 in the following manner. The coil unit A1 is placed over stator slots 1–9 and coil sides 110, 120 and 124 are respectively positioned in the bottom of slots 1, 2 and 3 while coil sides 128, 130, 126 and 112 are raised above slots 4, 6, 7, 8 and 9 for later placement therein. The coil unit C4 is then placed over slots 34–36 and 1–6, and the coil sides 110, 120 and 124 are then placed in the bottom of slots 34, 35, 36 and the coil sides 128 and 130 are placed over the sides 110 and 124 of the coil A1 already in slots 1 and 3. Coil sides 126, 122 and 112 of the coil C4 remain disposed over the raised coil sides 128 and 130 of the coil unit A1.

The coil unit B4 is then placed over slots 31–36 and 1–3, and coil sides 110, 120, 124, 128, 130, 126, 122 and 112 are respectively placed therein. Coil side 112 of the coil unit B4 is thus placed in slot 3 in a top slot location over the medially located coil side 130 of the coil unit C4 and over bottom located coil side 124 of the coil unit A1. Coil side 122 of the coil unit B4 is disposed in slot 2 in a top location over bottom located coil side 120 of the coil unit A1. There are three coil sides disposed in slot 1, with the coil side 126 of the coil unit B4 disposed at the top location, the coil side 128 of the coil unit C4 disposed at the middle location, and the coil side 110 of the coil unit A1 disposed at the bottom location.

The coil unit A4 is then placed in stator slots 28–36 in a manner similar to that described for the placement of the coil unit B4 in the stator slots 31–36 and 1–3. Similarly, in a counterclockwise direction about the periphery of the stator 102, coil units C3, B3, A3, C2, B2, A2, C1 and B1 are disposed in the stator slots spanning from the stator slot 33 to the stator slot 4. The previously noted raised coil sides of the coil units A1 and C4 are then placed in the slots 4, 5, 6, 7, 8 and 9 over the coil sides of the coil unit B1 or C1 and the placement of the coil sides is then completed.

As a result, the disposition of coil sides in the stator slots 1–36 is as shown in the schematic of FIG. 5. Two-thirds of the stator slots are each provided with three coil sides having respective bottom (inmost), middle and top (outmost) slot locations therein, and one-third of the stator slots are provided with two coil sides having respective bottom and top locations therein. Suitable insulation (not shown) is preferably used in each slot in accordance with well known techniques to space adjacent coil sides from each other and from the stator iron.

The disposition of the winding 104 in the stator 102 is characterized with manufacturing facility and economy by reason of the ease with which the identical coil units 106 can be disposed in the stator slots 1–36. In one sample embodiment of the invention, approximately 85% of the total winding effort was allocated to machine labor with the balance of the required winding effort provided manually.

Simultaneously, in the completed machine, the coil sides of the coil units 106 are disposed in the stator slots 1–36 in such a manner as to provide for substantial electrical balance among the phase circuits A, B and C in the winding 104. Thus, as shown in the table of FIG. 6, the phase circuits A, B and C in the concentric coil winding 104 all have the same number of coil sides 110, 120 and 124 in the bottom location of various stator slots, the same number of coil sides 128 or 130 in the middle location of various stator slots, and the same number of coil sides 112, 122 and 126 in the top location of various stator slots. Because of the congruence of the locations of the coil sides in the stator slots for the phase circuits A, B and C of the winding 104, phase reactance and phase resistance is substantially identical for the phase circuits A, B and C. The fact that the coil units 106 are all preferably of identical configuration also aids in achieving this parameter balance.

In FIGURE 8, there is shown another embodiment of the invention in the form of a two-pole three-phase induction motor 150. In this case, there is only shown a schematic view of the stator with stator slots indicated numerically from 1 to 24 along a linear row in a manner similar to the schematic shown for the four-pole motor in FIG. 5. Concentric coil winding 152 comprises six concentric coil units 154 (FIG. 7) or $A_1$, $A_2$, $B_1$, $B_2$, $C_1$ and $C_2$ (FIG. 8), and each of the coil units 154 includes concentric coils 156, 158, 160, 162, 164 and 166 concentrically wound about each other in a manner similar to that described for the concentric coil unit 106 shown in FIGS. 2, 3 and 4. Thus, the outermost coil 156 is in this case provided with 46 turns, the coil 158 is provided with 43 turns, etc., and the innermost coil 166 is provided with six turns. These turns thus are provided in accordance with the sinusoidal ratios indicated under the respective turn numbers.

The concentric coil units 154 are sized to span 12 stator slots in the twenty-four slot two-pole motor 150. The coil unit A1 can first be disposed over slots 1–2, with leftmost coil sides of coils 156, 158, 160 and 162 then disposed at the bottom of slots 1–4 and with the coil sides of coils 164 and 166 and rightmost coil sides of coils 162, 160, 158 and 160 raised above slots 5–12. The coil unit C2 is then disposed in stator slots 21–24 and 1–4, with rightmost coil sides of coils 160, 162, 164 and 166 disposed above the coil unit A1 and above slots 5–9. The coil units B2, A2, C1 and B1 are then respectively disposed in the stator slots with the coil side-slot locations indicated, and finally the raised coil sides of coil unit A1 are placed in slots 5–12 and the raised coil sides of the coil unit C2 are placed in the stator slots 5–8.

In this embodiment, there are provided three (suitably insulated) coil sides in each slot, and the disposition of the winding 152 is characterized with manufacturing facility and economy in a manner similar to that described for the embodiment of the invention shown in FIG. 1. Electrical phase balance is again substantially provided among phase circuits A, B and C as indicated in the table shown in FIG. 9. Thus, all of the phases A, B and C have the same number of sides of coils 156, 158, 160 and 162 in slot bottom (inmost) positions, the same number of sides of coils 164 and 166 in slot middle positions, and the same number of sides of coils 162, 160, 158 and 156 in slot top (outmost) positions.

As a general overview of the described and other embodiments of the invention, it is noted that a key factor underlying the results achieved is the relative placement of the concentric coil units. Thus, in both the four-pole, thirty-six slot motor 100 and the two-pole, twenty-four slot motor 150, each of the concentric coil units 106 or 154 is disposed "above" the next adjacent unit 106 or 154 in the clockwise direction (or counterclockwise direction if desired). That is, each coil side of any given concentric coil unit 106 or 154 is disposed in a relatively upper or outward slot position in the associated slot if the next clockwise adjacent concentric coil unit 106 or 154 has a coil side associated with the same slot. In slots where three coil sides are located, the coil sides are respectively placed in bottom, middle and top slot positions. As a by-product advantage of the placement of the concentric coil units as described, the coil end turns are so disposed at the front and rear of the machine that coil crossovers and associated insulation problems are eliminated.

As already indicated, in the four-pole, thirty-six slot motor 100 two-thirds of the slots are provided with three coil sides, and in the two-pole, twenty-four slot motor 150 all of the slots are provided with three coil sides. By extension in a six pole, thirty-six slot, three-phase induction motor (not shown) constructed in accordance with the principles of the invention so as to have three coil concentric coil units which span six slots, all of the slots are provided with three coil sides. So long as the coil units are placed as described, however, the fact that some of the slots may have fewer coil sides than do the remaining slots in any given machine is substantially immaterial and phase balance and a spatial sinusoidal M.M.F. are substantially obtained in each of the described and other similar embodiments.

Although phase balance can be substantially achieved with fewer coils than the respective numbers of coils indicated for the concentric coil units in the motors 100 and 150 and in the referenced six pole motor, it is preferred that the number of coils employed in these machines or in other similar machines be the maximum number possible once the span of the outer coil of the coil unit is determined. Production of a spatial sinusoidal M.M.F. is then enhanced and, as is generally desirable, more uniform space utilization can often be obtained in the stator slots as in the case of the two-pole motor 150 in which all of the slots are uniformly filled. In any given machine design, however, the number of machine poles and phases, the number of stator slots, and the number of coils in the concentric coil units are coordinated to achieve the results described herein as well as other overall machine design objectives.

In most cases, another key factor underlying the operating results is the substantial identity of concentric coil units. There are possibly some cases, however, where differently sized concentric coil units can produce a spatial sinusoidal M.M.F. and phase balance so long as the concentric coil units are placed in the stator slots according to the manner described, but a manufacturing advantage of component duplication is then lost.

In the foregoing disclosure, several embodiments of the invention have been described only to illustrate the principles of the invention. Accordingly, it is desired that the invention be not limited by the embodiments described, but, rather, that it be accorded an interpretation consistent with the scope and spirit of its broad principles.

What is claimed is:

1. A dynamoelectric machine having a stator member with a plurality of slots therein, a polyphase stator winding disposed in said slots, each phase of said winding comprising a plurality of coil groups forming magnetic poles, each coil group consisting of a plurality of concentric coils having coil sides adapted to lie in different slots and all of the coil groups being substantially identical, the coil groups being disposed in overlapping relation in the slots with the coil groups of different phases following each other in a predetermined order around the stator, each coil group overlying the next adjacent coil group in one direction around the stator so that all coil sides of any coil group lie above any coil sides of the adjacent coil group or groups in said direction that lie in the same slot.

2. A dynamoelectric machine having a stator member with a plurality of slots therein, a polyphase stator winding disposed in said slots, each phase of said winding comprising a plurality of coil groups forming magnetic poles, each coil group consisting of a plurality of concentric coils having coil sides adapted to lie in different slots and all of the coil groups being substantially identical, the coil groups being disposed in overlapping relation in the slots with the coil groups of different phases following each other in a predetermined order around the stator, and with at least two coil sides of different coil groups lying in each slot, each coil group having at least one coil side lying in the bottom of a slot and each coil group overlying the next adjacent coil group in one direction around the stator so that the coil sides of each coil group which lie in the same slots as coil sides of an adjacent group in said direction lie above the coil sides of the adjacent group or groups in the slot.

3. A dynamoelectric machine having a stator member with a plurality of slots therein, a polyphase stator winding disposed in said slots, each phase of said winding comprising a plurality of coil groups forming magnetic poles, each coil group consisting of a plurality of concentric coils having coil sides adapted to lie in different slots and all of the coil groups being substantially identical, the coil groups being disposed in overlapping relation in the slots with the coil groups of different phases following each other in a predetermined order around the stator, and at least two coil sides of different coil groups lying in each slot, each successive coil group in one direction around the stator having at least the outer coil side at one side of the group lying in the bottom of a slot and each coil group extending in said direction and radially inwardly of the stator member to overlie the adjacent coil group in said direction so that the coil sides of each coil group which lie in the same slots as coil sides of an adjacent group in said direction lie above the coil sides of the adjacent group or groups in the slot.

References Cited

UNITED STATES PATENTS

| | | | |
|---|---|---|---|
| 2,647,696 | 8/1953 | Brunand | 310—202 |
| 2,783,403 | 2/1957 | Schumaier | 310—202 |
| 2,795,712 | 6/1957 | Suhr | 310—198 |
| 2,796,543 | 6/1957 | Dunn | 310—202 |
| 2,905,840 | 9/1959 | Dunn | 310—202 |
| 2,947,894 | 8/1960 | Strang et al. | 310—202 |
| 3,238,403 | 3/1966 | Sauer | 310—202 |

MILTON O. HIRSCHFIELD, *Primary Examiner.*

L. L. SMITH, *Assistant Examiner.*